No. 752,953. PATENTED FEB. 23, 1904.
A. P. BRUSH.
TRANSMISSION GEAR.
APPLICATION FILED OCT. 11, 1902.
NO MODEL. 3 SHEETS—SHEET 2.
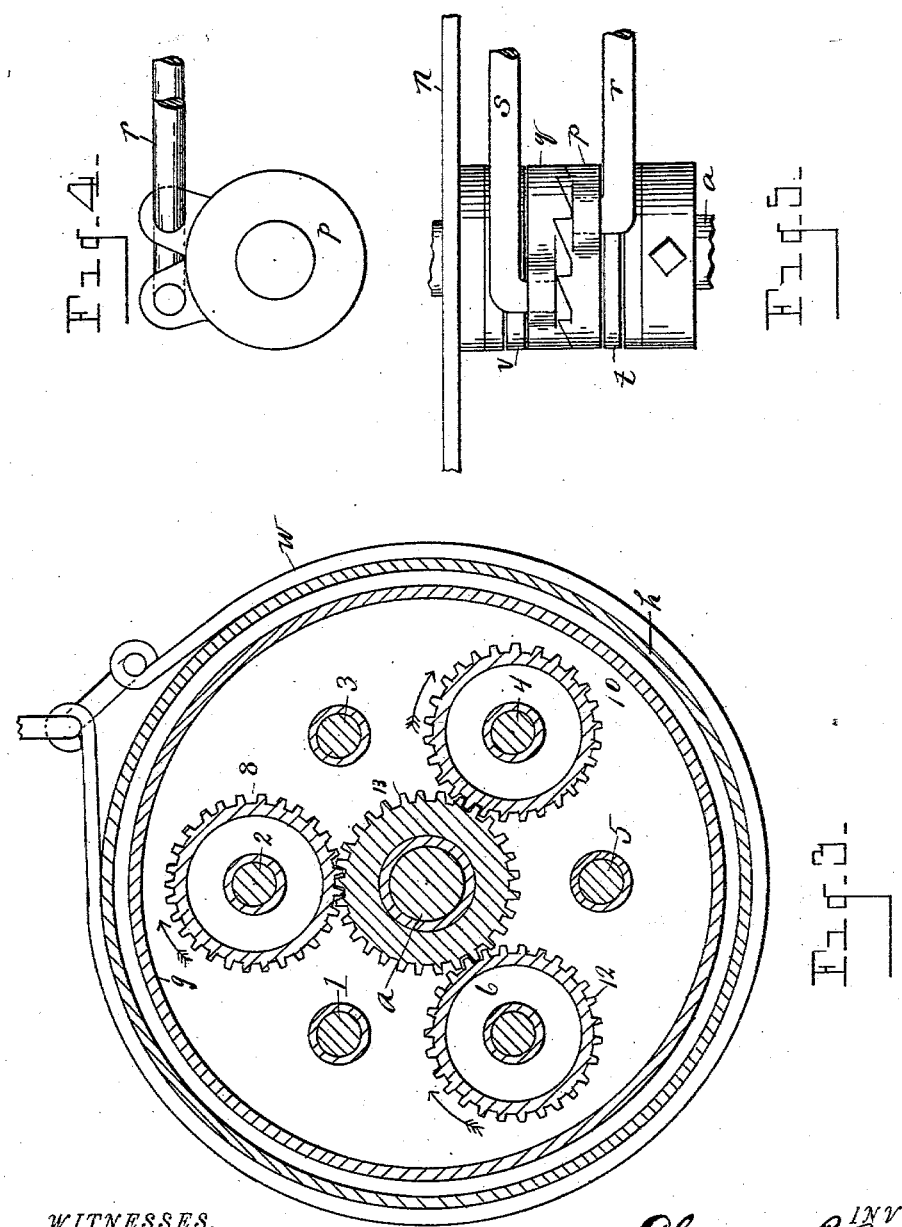

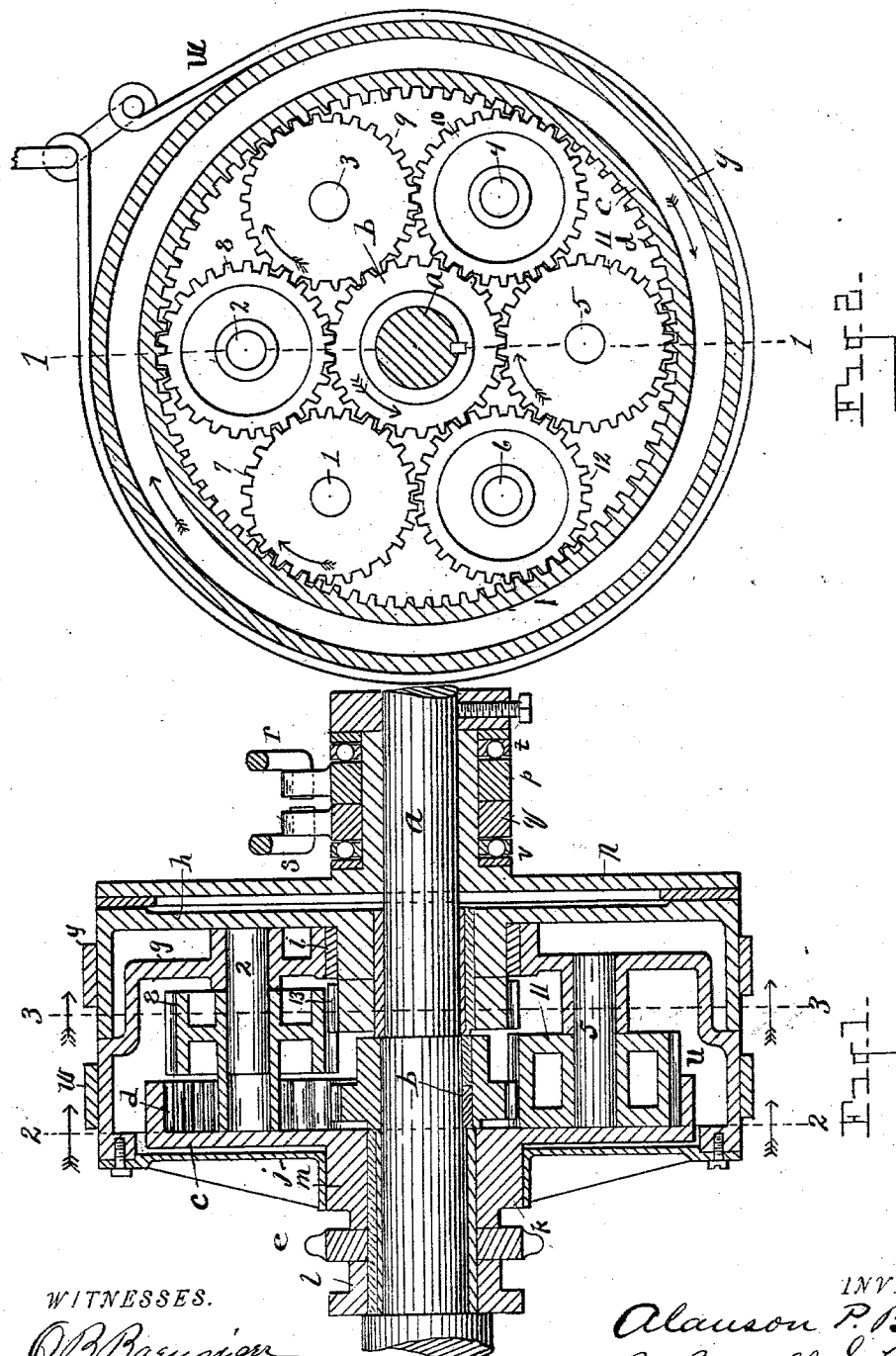

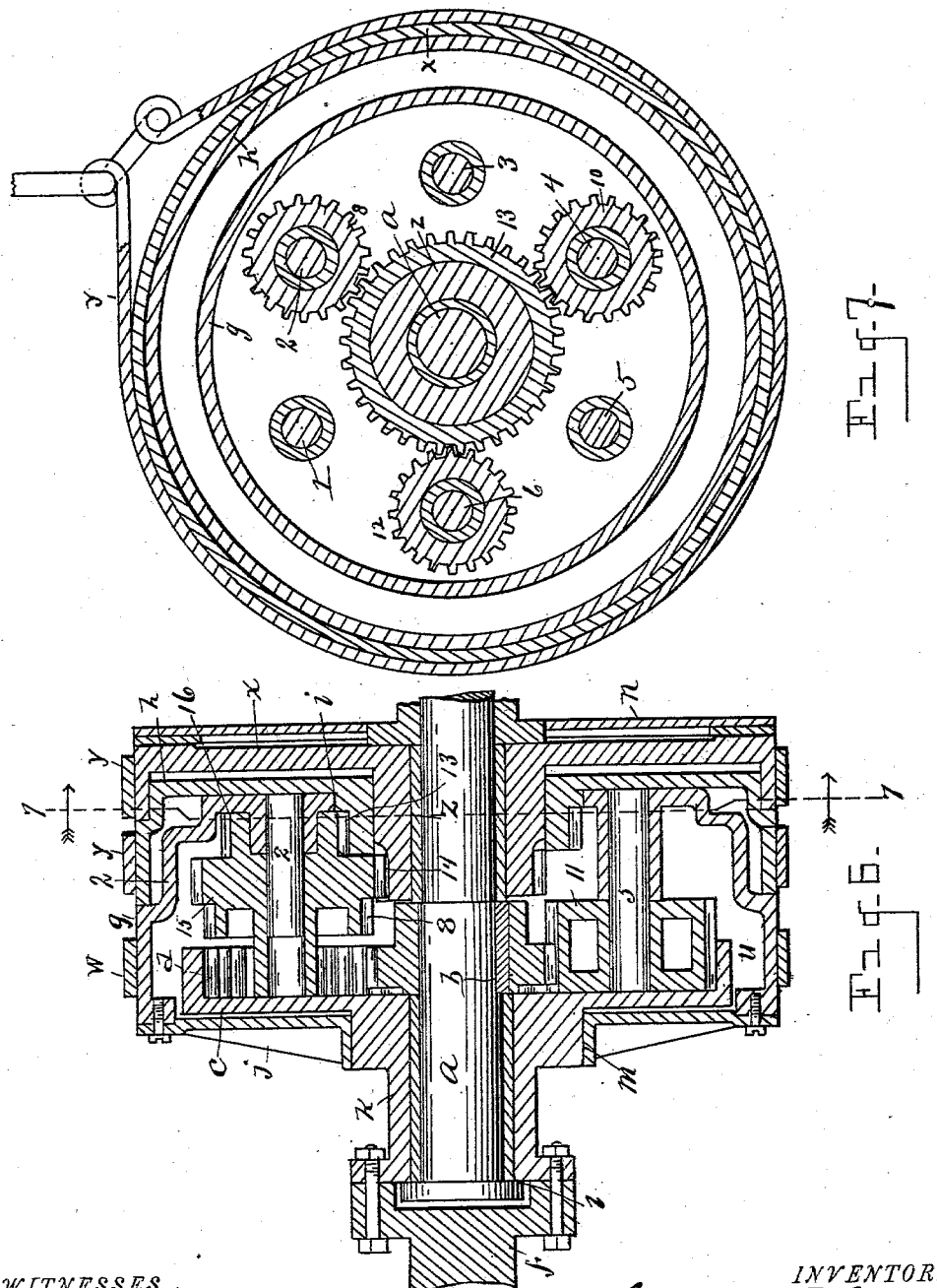

No. 752,953. Patented February 23, 1904.

UNITED STATES PATENT OFFICE.

ALANSON P. BRUSH, OF DETROIT, MICHIGAN.

TRANSMISSION-GEAR.

SPECIFICATION forming part of Letters Patent No. 752,953, dated February 23, 1904.

Application filed October 11, 1902. Serial No. 126,880. (No model.)

*To all whom it may concern:*

Be it known that I, ALANSON P. BRUSH, a citizen of the United States, residing at Detroit, county of Wayne, State of Michigan, have invented a certain new and useful Improvement in Transmission-Gear, of which the following is a specification, reference being had to the accompanying drawings, which form a part of this specification.

My invention has for its object certain new and useful improvements in transmission-gear; and it consists of the construction, combination, and arrangement of devices hereinafter described and claimed, and illustrated in the accompanying drawings, in which—

Figure 1 is a view in section on the line 1 1, Fig. 2, illustrating features of my invention. Fig. 2 is a view in section on the line 2 2, Fig. 1. Fig. 3 is a view in section on the line 3 3, Fig. 1. Fig. 4 is a detail view of a portion of a locking device in end elevation. Fig. 5 is a side elevation of the locking mechanism. Fig. 6 is a cross-section illustrating a modification of the invention. Fig. 7 is a view in section on the line 7 7, Fig. 6. Figs. 1, 2, 3, 4, and 5 show the device in its simplest form and construction.

My invention is designed to provide a transmission-gear or a speed varying and reversing device for power-propelled vehicles and the like.

The aim of my invention is to provide a speed changing and reversing device whereby a high rate of speed is secured by locking the whole combination to the power-shaft, so that the whole mechanism will revolve therewith, and whereby one or more lower speeds may be secured in the same direction and a lower speed be secured in the opposite direction, the power-shaft turning continuously in the same direction. In the accomplishment of these results the power-shaft may be allowed to rotate to transmit motion to a driven member, as a sprocket-wheel or other power-transmitting device.

I carry out my invention as follows:

In the drawings, $a$ indicates a power-shaft driven by any suitable source of power. Said shaft is provided with a driving-gear $b$. A power-transmitting member is indicated at $c$, loosely mounted upon said shaft, the same being provided with an internal gear, (indicated at $d$.) Said member is also shown in Fig. 1 provided with a sprocket-wheel $e$. In Fig. 6 said member is provided with a driven shaft $f$. A reversing member is indicated at $g$. The reversing member carries a series of shafts, (indicated by the numerals 1, 2, 3, 4, 5, and 6.) While I have shown six shafts in the accompanying drawings, I do not limit myself thereto, as the reversing member may be provided with plural shafts of any desired number. Upon said shafts are mounted corresponding gears. A low-speed member is indicated at $h$. The reversing member has a bearing, as at $i$, upon the inner flange of the low-speed member $h$. The reversing member $g$ also is provided with a cover $j$, journaled upon an outwardly-extended flange or hub $k$ of the power-transmitting member. A thrust-collar is indicated at $l$. The thrust-collar and sprocket-wheel are practically continuations of the hub $k$. The cover $j$ not only forms a journal, as at $m$, on the hub of the transmitting member, but also by closing the open side of the reversing member forms, in connection with the reversing member, an oil-case therewithin, as at $u$, the whole inner chamber of the reversing member and its end cover forming the oil-chamber and inclosing therewithin all the gears employed in the device, permitting all the said gears to be oiled through a single source of oil-supply. It will be obvious that when the mechanism is running at a high rate of speed the centrifugal force will throw and hold the oil toward the periphery of the reversing member or toward the periphery of the chamber, and it will also be obvious that whenever the device is stopped oil will run down over the gears, thereby lubricating the same. It will be equally obvious that when the mechanism is employed to transmit a low speed or motion in the opposite direction the inclosed gears by revolving within the oil-case will be lubricated. When the device is standing still, oil will accumulate in the bottom or lower portion of the oil-case.

The main driving-gear $b$ is constructed to mesh directly with a portion of the gears 7, 9, and 11, the gears 7, 9, and 11 being of greater width than the width of the toothed portion of the gear $b$. The opposite ends of the gears 7, 9, and 11 mesh with one end of the gears 8, 10, and 12, the latter gears meshing with a gear 13 upon the inner end of the flange or hub of the low-speed member $h$.

A friction-plate is indicated at $n$. Any suitable mechanism may be employed to force the friction-plate $n$ against the adjacent face of the low-speed member $h$. It is evident that if the low-speed member $h$ is made to revolve with the shaft $a$ and at the same speed the sprocket-wheel $e$ will have to revolve in a corresponding manner.

The gears 7, 9, and 11 mesh with the internal gear $d$ of the power-transmitting member $c$.

The gears 7, 9, and 11 may be termed the "reversing-pinions," while the gears 8, 10, and 12 may be termed the "low-speed pinions." The low-speed pinions 8, 10, and 12 are shown so related with the gears 7, 9, and 11 as to mesh on both sides with the adjacent gears. For example, one end of gear 8 meshes with gears 7 and 9. The particular mechanism shown herewith for forcing the friction-plate $n$ against the low-speed member $h$ consists of two toothed disks $p$ $q$, having interlocking teeth on their adjacent surfaces, said teeth having beveled or wedge-shaped adjacent faces. The disks are provided with operating-rods $r$ and $s$. Thrust-bearings are indicated at $t$ and $v$ on each side of the toothed disks, respectively.

The operation of the mechanism shown in Figs. 1 to 5 is as follows: By a proper movement of the locking mechanism the friction-plate $n$ may be forced against the low-speed member $h$, causing the low-speed member to rotate with the driving-shaft and obviously carrying all the rest of the mechanism therewith, giving to the sprocket-wheel a speed equal to that of the driving-shaft and in the same direction. If it is desired to reverse the motion, the friction-plate $n$ is unlocked and friction is applied to the periphery of the reversing member $g$ in any suitable manner, as by a friction device or band $w$, preventing the reversing member from revolving and causing the shafts 1 2 3 4 5 6 to stand still, in consequence of which motion imparted from the driving-gear $b$ to the reversing-gears 7, 9, and 11 is imparted to the internal gear $d$ on the transmission member $c$, causing said transmitting member to revolve in the opposite direction, the ratio of the speed being inversely proportional to the number of the teeth upon the inner gear $d$ and upon the main driving-gear $b$. When a lower speed is desired in the same direction as that of the driving-shaft, friction is applied to the periphery of the low-speed member $h$ in any suitable manner, as by a friction-band $y$ holding said low-speed member still and with it the gear 13. The driving-gear $b$ meshing with the reversing-pinions 7, 9, and 11, and the pinions 7, 9, and 11 meshing with the low-speed pinions 8, 10, and 12, and the pinions 8, 10, and 12 meshing with the now stationary gear 13, motion is thereby imparted to the reversing member $g$ in the same direction as that of the driving-shaft, and because of the meshing of the reversing-pinions 7, 9, and 11 with the internal gear $d$ of the power-transmitting member $c$ the power-transmitting member will be caused to rotate in the same direction as the driving-shaft at a lower speed. The rates of the rotations of the driving-shaft and transmitting member may be varied by changing the gear ratios, preferably the ratio between the gear 13 and the low-speed pinions 8, 10, and 12 meshing therewith. More than one ratio of slow speed is obtainable by using more than one low-speed member with different-sized gears thereon meshing with different diameters of gears formed on the low-speed pinions 8, 10, and 12, as in Figs. 6 and 7. In said latter figures is added an additional low-speed member $x$, with an added friction-band $y$. The additional low-speed member $x$ is provided with an inwardly-projecting hub $z$, said hub provided with a gear 14 at its inner end, the low-speed pinions meshing therewith being each provided with toothed portions of different diameters, as indicated, for example, at 8, 15, and 16.

The gear 8 is shown in Fig. 6 with its ends of different diameters, and it will be understood that the corresponding pinions 10 and 12 are similarly constructed.

It is evident that the power-transmission member $c$ and the driven member are attached the one to the other and form in reality as a whole a power-transmitting member.

It will be evident from the foregoing description that the reverse motion is obtained by means of the driving-gear, the reverse pinions, internal gear, and the locking device for locking the member upon which the reverse pinions are journaled.

The low speed is obtained by the use of the driving-gear upon the driving-shaft, the reverse-pinions, the internal gear, the low-speed pinions, the low-speed gear, and a locking device to prevent the rotation of the low-speed gear.

Plural low speeds are obtained in the same manner with the addition of other low-speed members, as shown in the drawings.

The high speed is obtained by all of the before-mentioned members except the locking device for the low-speed and reverse members and by the addition of a locking device which causes the low-speed member or members to revolve with the driving-shaft, thereby preventing any motion of the other parts other than a similar rotation with the driving-shaft.

What I claim as my invention is—

1. A transmission device comprising a driving-shaft, a single driving-gear thereupon, a single internal gear, a power-transmission member rigidly connected with the single internal gear, actuating mechanism to secure a reverse motion of the transmission member to that of the driving-shaft, and to secure plural speeds ahead of the transmission member, said reversing motion and said plural speeds ahead secured by the use of the said single driving-gear and the said single internal gear.

2. In a transmission device, a driving-shaft, a single driving-gear thereupon, a power-transmission member provided with a single internal gear, actuating mechanism comprising reversing mechanism embodying pinions meshing with the internal gear on the transmission member to secure a reverse motion, additional pinions meshing with the reversing-pinions to secure a low speed ahead, and means to prevent the rotation of said pinions upon their axes, the reversing mechanism embodying a member upon which the reversing-pinions and low-speed pinions are journaled.

3. In a transmission device, a driving-shaft, a driving-gear thereupon, a power-transmission member, reversing mechanism embodying pinions to secure a reverse motion of the power-transmission member, additional mechanism in combination with said reversing mechanism to secure plural speeds ahead of the power-transmission member embodying additional pinions, means to prevent the rotation of all the said pinions, the reversing mechanism embodying a member upon which all of said pinions are journaled, and a cover for said member forming in connection with said member an oil-case.

4. In a transmission device a driving-shaft, a single driving-gear thereupon, a power-transmission member, reversing mechanism embodying pinions to secure a reverse motion of the power-transmission member, additional mechanism in combination with said reversing mechanism embodying additional pinions to secure plural speeds ahead of the power-transmission member, means to prevent the rotation of all of said pinions, said reversing mechanism embodying a member upon which all of said pinions are journaled, and a cover for said member forming in connection with said member an oil-case in which all of the gears are revoluble.

5. In a transmission device, a driving-shaft, a single driving-gear thereupon, a power-transmission member provided with a single internal gear, reversing mechanism embodying pinions to secure a reverse motion of the power-transmission member, additional mechanism in combination with said reversing mechanism embodying additional pinions to secure plural speeds ahead of the power-transmission member, and means to prevent the rotation of all of said pinions, said reversing mechanism embodying a member upon which all of said pinions are journaled, the reverse motion and the speeds ahead of the power-transmission member being secured through said internal gear.

6. In a transmission device, a driving-shaft, a single driving-gear thereupon, a power-transmission member provided with a single internal gear, reversing mechanism embodying pinions to secure a reverse motion of the transmission member, additional mechanism in combination with said reversing mechanism embodying additional pinions to secure plural speeds ahead of the power-transmission member, means to prevent the rotation of said pinions, and said reversing mechanism embodying a member upon which all of said pinions are journaled, the reversing motion and the speeds ahead being secured through said single internal gear.

7. A transmission device comprising a driving-shaft turning continuously in the same direction, a single internal gear, a power-transmission member rigidly connected with the single internal gear, reversing mechanism embodying gears meshing with the internal gear of the transmission member, additional mechanism in combination with said reversing mechanism to secure plural speeds ahead, said plural speeds ahead and the reverse motion secured by said single internal gear.

8. In a speed varying and reversing apparatus, a driving-shaft, a single driving-gear thereupon, a power-transmission member loosely mounted upon said shaft, a single internal gear, said gear rigidly attached to the transmission member, reversing mechanism to reverse the transmission member embodying reversing-pinions, and additional mechanism coöperating with a part of said reversing mechanism and with said single internal gear to produce a plurality of speeds ahead, said plural speeds ahead and a reverse motion secured through said single internal gear.

9. In a transmission device, a driving-shaft, a single driving-gear thereupon, a power-transmission member loosely mounted upon said shaft and provided with a single internal gear, reversing mechanism embodying reversing-pinions to secure a reverse motion of the power-transmission member, additional mechanism in combination with said reversing mechanism to secure plural speeds ahead of the power-transmission member embodying additional pinions meshing with the reversing-pinions, the reversing mechanism embodying a member carrying all of said pinions, said additional mechanism embodying a low-speed member having a pinion meshing with the low-speed pinions, and a friction device to engage said low-speed member, the shafts of the said pinions engaged upon one side of the reversing member.

10. In a transmission device, a driving-shaft, a single driving-gear thereupon, a power-transmission member loosely mounted upon said shaft and provided with a single internal gear, reversing mechanism embodying pinions meshing with said internal gear, additional mechanism in combination with a part of said reversing mechanism to secure a low speed ahead embodying pinions meshing with the reversing-pinions, the reversing mechanism embodying a member carrying all of said pinions, the low-speed mechanism embodying a member having a pinion meshing with the low-speed pinions, and a cover for said reversing member and forming therewith an oil-case.

11. In a transmission device, a driving-shaft, a single driving-gear thereupon, a power-transmission member loosely mounted upon said shaft and provided with a single internal gear, mechanism embodying reversing-pinions meshing with said internal gear, additional mechanism embodying low-speed pinions meshing with the reversing-pinions, the first-named mechanism comprising a member carrying all of the said pinions, said low-speed mechanism embodying a member having a pinion meshing with the low-speed pinions, said last-named member having a peripheral flange and an inwardly-extended toothed hub.

12. In a transmission device a driving-shaft, a driving-gear thereupon, a power-transmission member loosely mounted upon said shaft, reversing mechanism to secure a reverse motion of the power-transmission member to that of the driving-shaft, and additional mechanism in combination with a part of said reversing mechanism to secure plural speeds ahead in the direction of the driving-shaft, the additional mechanism comprising a low-speed member mounted upon said shaft, the reversing mechanism comprising a member mounted upon the hub of the low-speed member and means to prevent the rotation of said members.

13. A transmission device of the type described comprising a driving-shaft, a power-transmission member, reversing mechanism embodying a reversing member, additional mechanism in combination with said reversing mechanism to secure plural speeds ahead, and a cover for the reversing member journaled upon the hub of the power-transmission member.

14. A transmission device of the type described having a driving-shaft, a power-transmission member, reversing mechanism embodying a reversing member open at one side thereof, additional mechanism in combination with said reversing mechanism to secure plural speeds ahead, and a cover closing one side of the reversing member, and forming in connection therewith an oil-case.

15. In a transmission device, a driving-shaft provided with a single driving-gear, a power-transmission member loosely mounted upon said shaft and provided with a single internal gear, reversing mechanism embodying pinions meshing with said internal gear, additional mechanism in combination with a part of said reversing mechanism embodying additional pinions meshing with the reversing-pinions, a low-speed member having a pinion meshing with the low-speed pinions, and a friction device to engage with said low-speed member, the reversing mechanism embodying a member carrying all of said pinions, and a cover for said reversing member and forming therewith an oil-case, said oil-case inclosing all the gears embodied in said mechanism.

16. In a transmission device, a driving-shaft, a single driving-gear thereupon, a power-transmission member provided with a single internal gear, reversing mechanism embodying pinions meshing with said internal gear and with the driving-gear, additional mechanism in combination with a part of said reversing mechanism embodying a member having a gear thereupon, and low-speed pinions meshing with the reversing-pinions and with the gear of the low-speed member, said reversing-pinions being of greater width than the width of the toothed portion of the driving-gear.

17. In a transmission device, a driving-shaft, a single driving-gear thereupon, a power-transmission member mounted upon said shaft and provided with a single internal gear, reversing mechanism embodying pinions meshing with the said internal gear, additional mechanism in combination with a part of the said reversing mechanism embodying additional pinions meshing with the reversing-pinions, and a low-speed member provided with a pinion meshing with the low-speed pinions, the reversing mechanism embodying a member carrying all of said pinions, and a friction device to engage with said low-speed member, the low-speed member having a peripheral flange and an inwardly-extended toothed hub, the reversing-pinions being of greater width than the toothed portion of the driving-gear, one end of the low-speed pinions meshing with the gear upon the inner end of the hub of the low-speed member.

18. A transmission device comprising a driving-shaft, a single driving-gear thereupon, a power-transmission member, a single internal gear rigidly connected with the power-transmission member, reversing mechanism to secure a reverse motion of the power-transmission member, additional mechanism coöperating with a part of said reversing mechanism to secure plural speeds ahead of the power-transmission member, said reverse motion and said plural speeds ahead secured from said single driving-gear and from said single internal gear, said additional mechanism embodying a low-speed member revoluble with the driving-shaft at the will of the operator, and means to cause the low-speed member to revolve with the shaft and at the same speed as that of the shaft.

19. In a speed varying and reversing apparatus a transmission device comprising a driving-shaft, a single driving-gear thereupon, a power-transmission member loosely mounted upon said shaft, a single internal gear, said gear rigidly attached to the transmission member, and actuating mechanism to secure a reverse motion of the power-transmission member, and to secure plural speeds ahead of said member, said reverse motion and said plural speeds ahead both secured by the use of the single driving-gear and the said single internal gear, said mechanism comprising reversing-pinions meshing with said internal gear, and means to prevent the rotation of said pinions.

20. In a transmission device, a driving-shaft, a single driving-gear thereupon, a power-transmission member mounted upon the shaft and provided with a single internal gear, reversing mechanism embodying reversing-pinions meshing with said internal gear, additional mechanism in combination with a part of said reversing mechanism embodying additional pinions meshing with said reversing-pinions, and a low-speed member provided with a pinion meshing with the low-speed pinions, the reversing mechanism embodying a member carrying all of said pinions, and a friction device to engage with said low-speed member, said pinion meshing on opposite sides with the reversing-pinions.

21. In a transmission device, a driving-shaft, a single driving-gear thereupon, a power-transmission member mounted upon said shaft and provided with a single internal gear, reversing mechanism embodying pinions meshing with the internal gear, additional mechanism in combination with a part of said reversing mechanism embodying additional pinions meshing with the reversing-pinions, and a low-speed member provided with a pinion meshing with the low-speed pinions, the reversing mechanism embodying a member carrying all of said pinions, and a friction device to engage with said low-speed member to render said low-speed member rotatable with the driving-shaft and carrying all the rest of the mechanism therewith.

22. In a speed varying and reversing apparatus, a driving-shaft, a single driving-gear thereupon, a power-transmission member mounted upon said shaft, a single internal gear, said gear rigidly attached to the transmission member, reversing mechanism embodying pinions meshing with said internal gear, additional mechanism in combination with a part of said reversing mechanism embodying additional pinions meshing with the reversing-pinions, a member of the reversing mechanism revoluble about the shaft and carrying all of said pinions a member of the additional mechanism having a pinion meshing with said additional pinions, and means to prevent the said member of the reversing mechanism from rotating, the varying speeds ahead and the reverse motion secured through said single internal gear.

23. In a transmission device, a driving-shaft, a single driving-gear thereupon, a power-transmission member loosely mounted upon said shaft provided with a single internal gear, reversing-pinions meshing with said internal gear, and with the driving-gear, low-speed pinions meshing with the reversing-pinions, a reversing member carrying all of said pinions, a brake for the reversing member, a low-speed member, embodying a gear meshing with the low-speed pinions, and means to hold the low-speed member from rotation, whereby motion is imparted to the reversing member in the same direction as that of the driving-shaft.

24. In a transmission device, a driving-shaft, a single driving-gear thereupon, a power-transmission member loosely mounted upon said shaft, provided with a single internal gear, reversing mechanism embodying pinions meshing with said internal gear and with the driving-gear, additional mechanism in combination with a part of said reversing mechanism embodying additional pinions meshing with the reversing-pinions, and plural low-speed members each having pinions meshing with the low-speed pinions, the reversing mechanism comprising a member carrying all of said pinions, said low-speed pinions being of different diameters at their extremities.

25. In a transmission device, a driving-shaft, a single driving-gear thereupon, a power-transmission member loosely mounted upon said shaft provided with a single internal gear, reversing mechanism embodying pinions meshing with said internal gear and with the driving-gear, additional mechanism in combination with a part of said reversing mechanism embodying additional pinions meshing with the reversing-pinions, and plural low-speed members each having pinions meshing with the low-speed pinions, the reversing mechanism embodying a member carrying all of said pinions, said low-speed pinions being of different diameters at their extremities, the pinions of said low-speed members being of different sizes and having their ends meshing with the low-speed pinions.

26. In a transmission device, a driving-shaft, a driving-gear thereupon, a power-transmission member, a single internal gear rigidly secured to the transmission member, mechanism to secure a reverse motion of the power-transmission member, additional mechanism coöperating with a part of the reversing mechanism to secure plural speeds ahead of the transmission member, said additional mechanism embodying a low-speed member, a friction-plate, toothed disks having interlocking wedge-shaped teeth on their adjacent faces, and means to rotate said disks to force the friction-plate upon the low-speed member.

27. In a transmission device, a driving-shaft provided with a driving-gear, a transmission member, a single internal gear which is rigidly attached to the transmission member, mechanism for obtaining plural speeds ahead, and a reverse motion of the transmission member, said plural speeds ahead and the reverse motion both secured through said single internal gear.

28. In a speed varying and reversing apparatus, a driving-shaft provided with a driving-gear, a transmission member, a single internal gear, said gear rigidly attached to the transmission member, mechanism for obtaining plural speeds ahead and a reverse motion of the driving-shaft, said plural speeds ahead and the reverse motion both secured through said single internal gear and through said driving-gear upon the driving-shaft.

29. A variable speed and reversing mechanism comprising a driving-shaft, a single driving-gear rigidly mounted thereupon, a power-transmission member comprising an internal gear and a power-transmitting device, said transmission member revoluble upon and revoluble with the driving-shaft, a gear loosely mounted upon the driving-shaft, a gear-case containing all of said gears, a cover for said case forming in connection therewith an oil-case, reversing mechanism embodying reversing-pinions within the gear-case meshing with the internal gear and with the driving-gear and journaled upon the gear-case, additional pinions within the gear-case and journaled thereupon meshing with the reversing-pinions, and with said loosely-mounted gear, a friction-drum outside the gear-case rigidly engaged with the loosely-mounted gear, said case journaled upon said drum, and said cover journaled upon the transmission member, a friction device revoluble with the driving-shaft to engage said drum, an additional friction device to engage said drum, and an additional friction device to engage the gear-case.

30. A variable speed and reversing mechanism comprising a driving-shaft, a single driving-gear rigidly mounted thereupon, a power-transmission member comprising an internal gear and a power-transmission device, said transmission member revoluble upon and revoluble with the driving-shaft, a plurality of gears loosely mounted upon the driving-shaft, a gear-case containing all of said gears, a cover for said case forming in connection therewith an oil-case, reversing mechanism embodying reversing-pinions within the gear-case meshing with the internal gear and with the driving-gear and journaled upon the gear-case, additional pinions within the gear-case and journaled thereupon meshing with the reversing-pinions and with said loosely-mounted gears, a plurality of friction-drums outside the gear-case rigidly engaged with the corresponding loosely-mounted gears, a friction device revolving with the driving-shaft to engage the adjacent drum, additional friction devices to engage each of said drums respectively, and an additional friction device to engage the gear-case.

31. In a speed varying and reversing device the combination of a driving-shaft and a single driving-gear thereupon, a transmission member, a single internal gear, said gear rigidly attached to the transmission member, and additional mechanism to give the transmission member more than two speeds in the same direction with the driving-shaft, and to give a single speed in the opposite direction, the plural speeds ahead and the reverse motion secured through said internal gear.

In testimony whereof I have signed this specification in the presence of two subscribing witnesses.

ALANSON P. BRUSH.

Witnesses:
N. S. WRIGHT,
M. M. STRUBLE.